(No Model.)
H. B. SHERIDAN.
ARMATURE FOR DYNAMO ELECTRIC MACHINES.
No. 262,136. Patented Aug. 1, 1882.
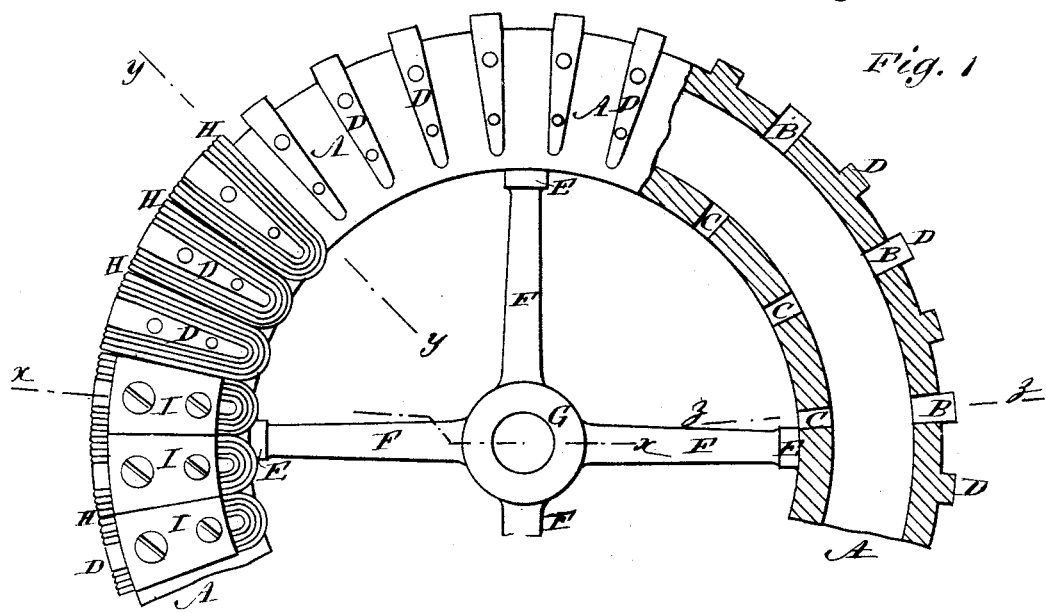
Fig. 1
Fig. 2
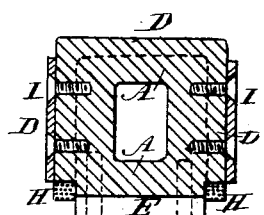
Fig. 3
Fig. 4
WITNESSES:
C. Neveux
C. Sedgwick
INVENTOR:
H. B. Sheridan
BY Munn & Co
ATTORNEYS.

UNITED STATES PATENT OFFICE.

HENRY B. SHERIDAN, OF CLEVELAND, OHIO.

ARMATURE FOR DYNAMO-ELECTRIC MACHINES.

SPECIFICATION forming part of Letters Patent No. 262,136, dated August 1, 1882.

Application filed February 20, 1882. (No model.)

*To all whom it may concern:*

Be it known that I, HENRY B. SHERIDAN, of Cleveland, Cuyahoga county, Ohio, have invented a new and useful Improvement in Armatures for Dynamo-Electric Machines, of which the following is a full, clear, and exact description.

Reference is to be had to the accompanying drawings, forming part of this specification, in which similar letters of reference indicate corresponding parts in all the figures.

Figure 1 is a side elevation of a portion of an armature to which my improvement has been applied, part of the helix-coils being removed and partly in section. Fig. 2 is a sectional elevation of a part of the same taken through the line $x\ x$, Fig. 1. Fig. 3 is a sectional elevation of a part of the same taken through the line $y\ y$, Fig. 1, with side plates attached. Fig. 4 is a sectional elevation of a part of the same taken through the line $z\ z$, Fig. 1.

The object of this invention is to provide armatures for dynamo-electric machines wound so as to bring the greatest possible part of the helices into the magnetic field of force of the magnets, and also to permit of readily replacing a helix that may be destroyed or injured.

A is an armature-core consisting of a hollow iron ring with apertures B in its periphery and corresponding apertures C in its inner side to admit of a circulation of air to cool the armature.

Upon the armature-core A are formed ribs D, the middle parts of which cross the periphery of the armature-core A, and their arms extend across the sides of the said core in radial directions nearly to the inner side of the said core A. The arms of the ribs or projections D are tapered, so that the grooves or channels between the adjacent ribs D will be of uniform width, as shown in Fig. 1.

The armature core A is secured by screws to T-heads E, formed upon the outer ends of the spider-arms F, the hub G of which is designed to be placed upon and secured to the shaft of a dynamo-electric machine.

H are the helices, which are bent twice at right angles, as shown in Fig. 3, so as to cross the periphery and extend nearly across the opposite sides of the armature-core A and fit upon the projections or ribs D. The helices H are secured in place upon the armature-core A by plates I, which are secured by screws to the outer sides of the ribs or projections D, and are made large enough to overlap the outer sides of the said helices, as shown in Fig. 1.

With this construction any of the armature-coils H that may be destroyed or injured can be readily removed and replaced by new coils.

Having thus described my invention, I claim as new and desire to secure by Letters Patent—

1. The armature-core A, provided with the ribs D, crossing its circumference and having their tapering ends bent over and secured to the sides thereof, in combination with the helices H, bent twice at right angles and embracing the ribs and securing-plates I, substantially as and for the purpose set forth.

2. The helices H, tapered at their ends, bent twice at right angles, and adapted to bear against opposite sides and circumference of the core, substantially as herein shown and described.

HENRY B. SHERIDAN.

Witnesses:
JAMES T. GRAHAM,
C. SEDGWICK.